United States Patent
Baiamonte et al.

(10) Patent No.: US 7,818,914 B1
(45) Date of Patent: Oct. 26, 2010

(54) FISH DEHOOKING DEVICE

(76) Inventors: John B. Baiamonte, 1211 Lost Creek Ct., Osprey, FL (US) 34229; Carl D. Wegner, N2258 Hilltop Rd., Markesan, WI (US) 53946

( * ) Notice: Subject to any disclaimer, the term of this patent is extended or adjusted under 35 U.S.C. 154(b) by 0 days.

(21) Appl. No.: 12/547,602

(22) Filed: Aug. 26, 2009

(51) Int. Cl.
A01K 97/18 (2006.01)

(52) U.S. Cl. .................................................... 43/53.5

(58) Field of Classification Search ............... 43/53.5
See application file for complete search history.

(56) References Cited

U.S. PATENT DOCUMENTS

| | | | |
|---|---|---|---|
| 112,959 A * | 3/1871 | Raymond .................... | 81/3.45 |
| 179,090 A * | 6/1876 | Barnes ........................ | 81/3.45 |
| 2,215,275 A * | 9/1940 | Philips ........................ | 43/53.5 |
| 2,441,458 A * | 5/1948 | Underwood ................. | 43/53.5 |
| 2,519,098 A * | 8/1950 | Aye .............................. | 43/53.5 |
| 2,662,331 A * | 12/1953 | Borup ......................... | 43/53.5 |
| 2,749,653 A * | 6/1956 | Patrowsky et al. ........... | 43/53.5 |
| 2,781,599 A * | 2/1957 | Steiner ........................ | 43/53.5 |
| 2,897,626 A * | 8/1959 | Buller ......................... | 43/53.5 |
| 2,947,106 A * | 8/1960 | Lewan ......................... | 43/53.5 |
| 3,099,100 A * | 7/1963 | Wiseman ..................... | 43/53.5 |
| 3,374,570 A * | 3/1968 | Lenzen ........................ | 43/53.5 |
| 3,397,479 A * | 8/1968 | Tyjewski ..................... | 43/53.5 |
| 3,555,718 A * | 1/1971 | Montgomery ............... | 43/53.5 |
| 3,603,021 A * | 9/1971 | Nunley ........................ | 43/53.5 |
| 3,680,248 A | 8/1972 | Wilkinson | |
| 3,713,243 A * | 1/1973 | Tetzner ....................... | 43/53.5 |
| 3,721,034 A | 3/1973 | Collins | |
| D227,759 S * | 7/1973 | Enagureto ................... | 43/53.5 |
| 3,872,618 A | 3/1975 | Petersen, Jr. | |
| 3,888,038 A | 6/1975 | Howell | |
| 3,997,998 A | 12/1976 | Petersen, Jr. | |
| 4,014,130 A | 3/1977 | Roberts | |
| 4,014,131 A | 3/1977 | Bendik | |
| 4,028,825 A * | 6/1977 | Tetzner ....................... | 43/53.5 |
| 4,045,904 A * | 9/1977 | Lore ........................... | 43/53.5 |
| 4,118,883 A * | 10/1978 | Watkins ...................... | 43/53.5 |
| 4,127,957 A * | 12/1978 | Bourquin et al. ............. | 43/53.5 |
| 4,206,561 A | 6/1980 | Wong et al. | |
| 4,342,171 A * | 8/1982 | Cripps et al. ................ | 43/53.5 |
| 4,914,853 A * | 4/1990 | Swindle ...................... | 43/53.5 |
| 4,941,253 A * | 7/1990 | Meagher ..................... | 29/273 |
| 4,998,375 A | 3/1991 | Mitchell | |
| 5,201,139 A | 4/1993 | Middleton | |
| 5,274,948 A * | 1/1994 | Harrison et al. ............. | 43/53.5 |

(Continued)

FOREIGN PATENT DOCUMENTS

JP 04237448 A * 8/1992

(Continued)

*Primary Examiner*—Darren W Ark
(74) *Attorney, Agent, or Firm*—Charles J. Prescott

(57) ABSTRACT

A dehooking device with treble hook guard including an elongated rod having a handle disposed at a first end thereof. A spiral looped hook removal end is formed at a second end of the rod and a looped treble hook guard positioned in close proximity to the hook removal end is formed being transversely oriented to the rod. The hook guard defines a perimeter at least as large as that defined by the distal ends of the hooks of a treble hook to shield the hooks from reengagement with the fish as the treble hook is being withdrawn from the fish along with the device.

5 Claims, 10 Drawing Sheets

U.S. PATENT DOCUMENTS

| | | | |
|---|---|---|---|
| 5,421,120 A | 6/1995 | Brumfield | |
| 5,784,830 A | 7/1998 | Brumfield | |
| 5,884,428 A | 3/1999 | Shelton | |
| 5,921,016 A | 7/1999 | Shelton | |
| 5,983,555 A * | 11/1999 | Biel | 43/53.5 |
| 6,038,808 A | 3/2000 | Bergeron et al. | |
| 6,138,401 A * | 10/2000 | Duncan | 43/53.5 |
| 6,205,698 B1 * | 3/2001 | Richards | 43/53.5 |
| 6,205,699 B1 | 3/2001 | Bogni | |
| 6,240,673 B1 | 6/2001 | Shelton | |
| 6,397,512 B1 * | 6/2002 | Chang | 43/53.5 |
| 6,397,513 B1 * | 6/2002 | Reed | 43/53.5 |
| 6,453,601 B1 * | 9/2002 | Duncan | 43/53.5 |
| 6,584,726 B2 | 7/2003 | Dehm | |
| 6,694,664 B1 * | 2/2004 | Knight | 43/17.2 |
| 6,840,002 B1 * | 1/2005 | Dick | 43/53.5 |
| 2003/0029075 A1 * | 2/2003 | Hebard | 43/53.5 |
| 2007/0089355 A1 * | 4/2007 | Burgett, Sr. | 43/53.5 |

FOREIGN PATENT DOCUMENTS

| | | | |
|---|---|---|---|
| JP | 07050969 A * | 2/1995 | |
| JP | 08140546 A * | 6/1996 | |
| JP | 09074968 A * | 3/1997 | |
| JP | 2001299175 A * | 10/2001 | |
| JP | 2005143416 A * | 6/2005 | |
| JP | 2008005775 A * | 1/2008 | |
| JP | 2008136424 A * | 6/2008 | |
| JP | 2009011309 A * | 1/2009 | |
| JP | 2009189357 A * | 8/2009 | |
| WO | WO 2005036958 A1 * | 4/2005 | |
| WO | WO 2005055712 A1 * | 6/2005 | |

* cited by examiner

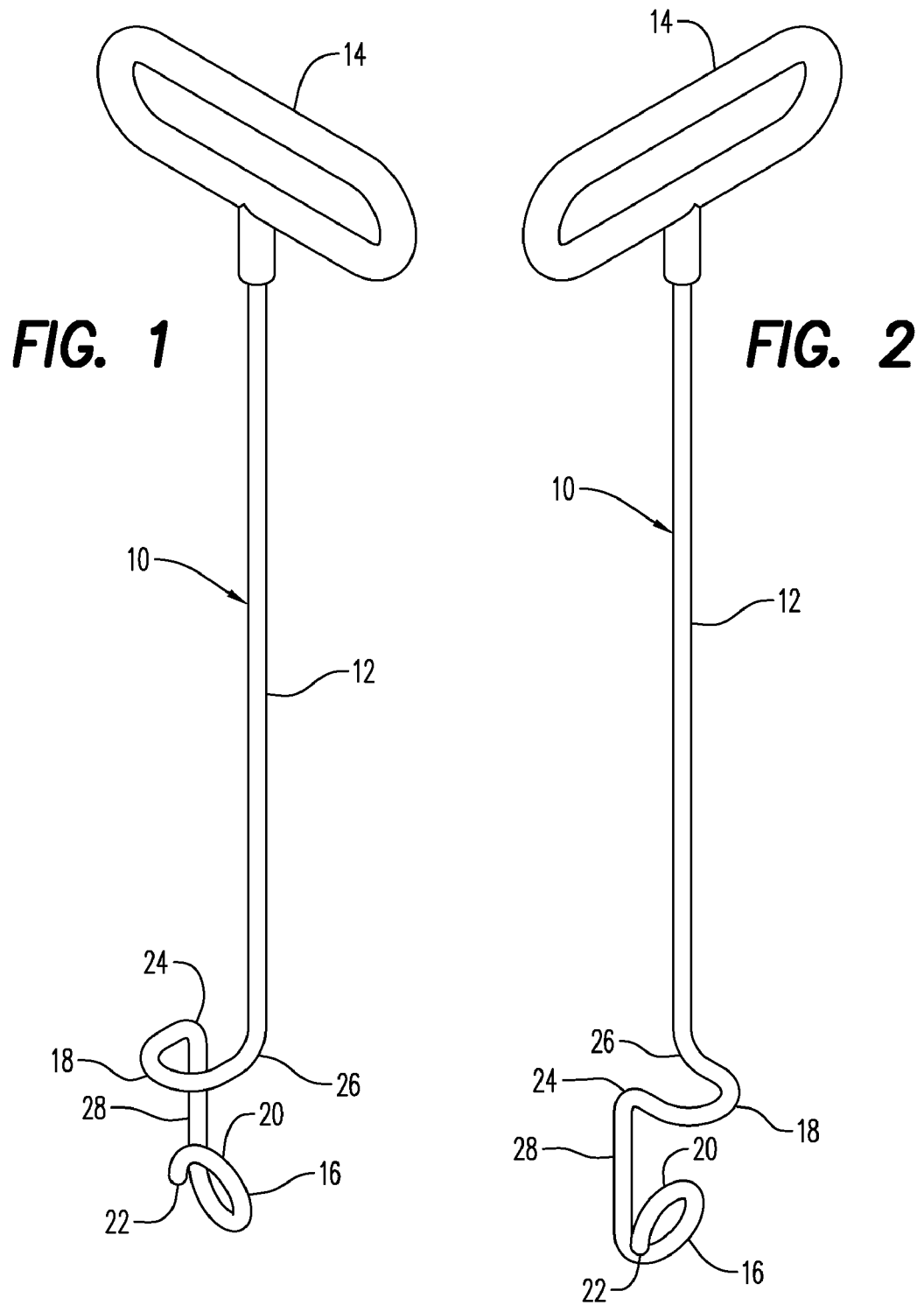

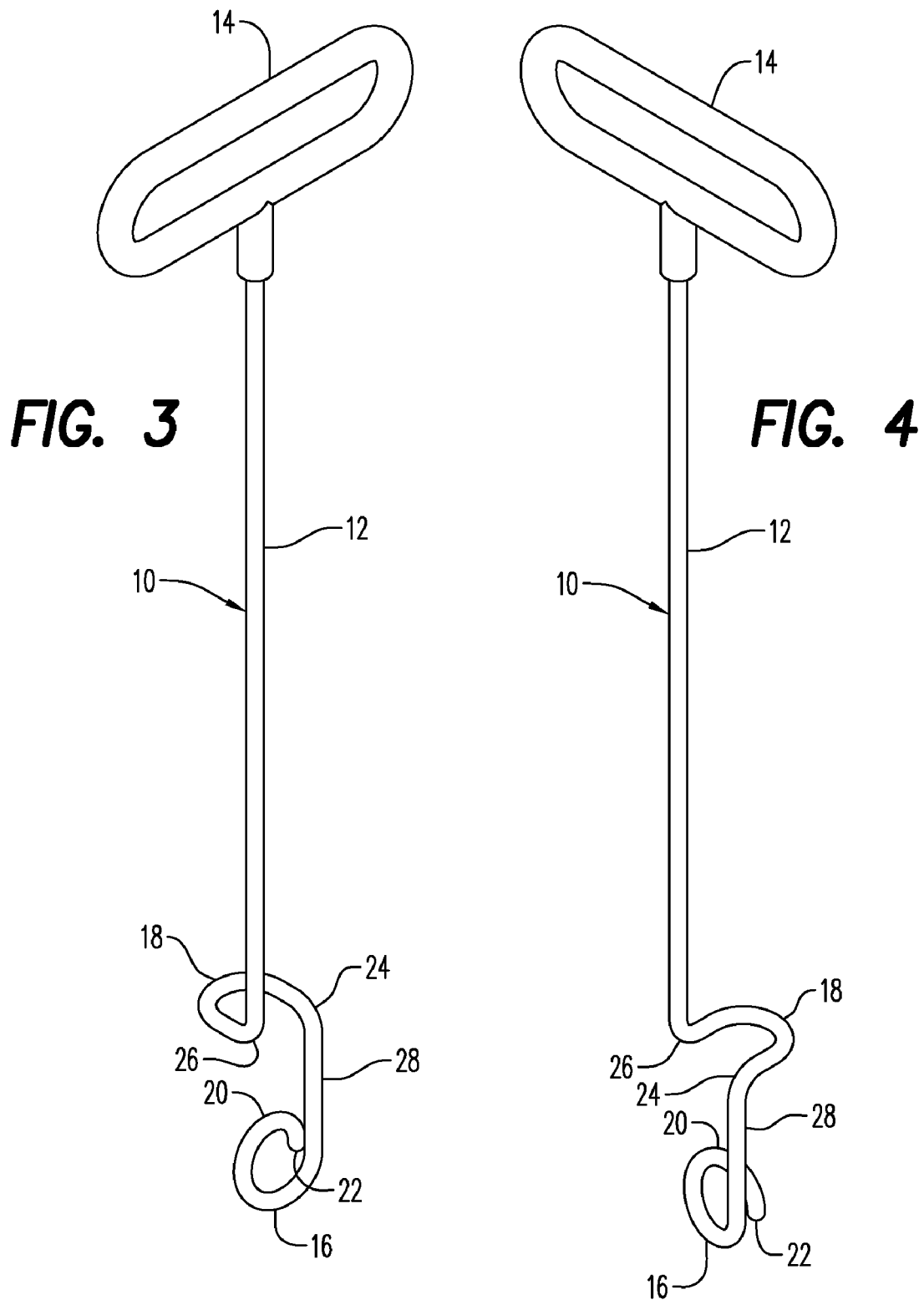

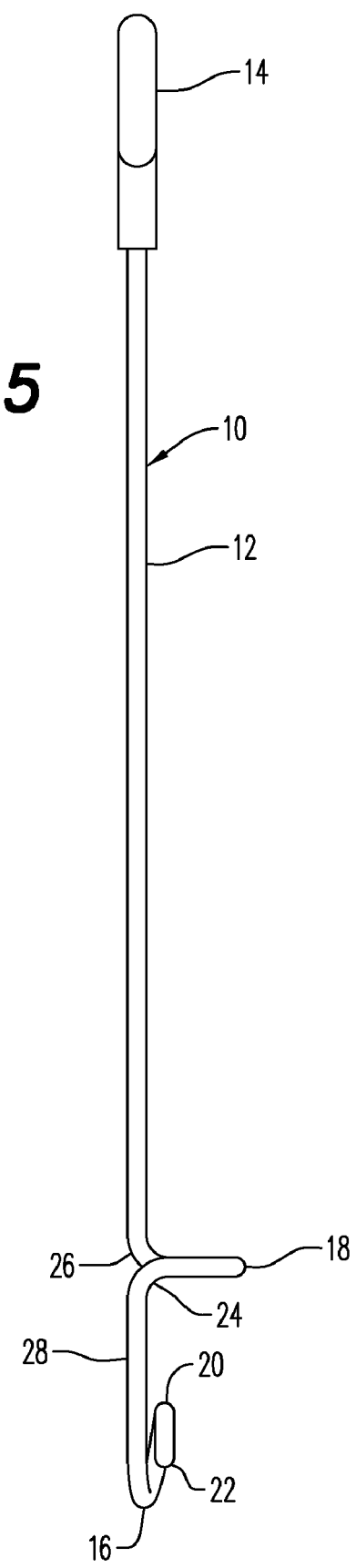
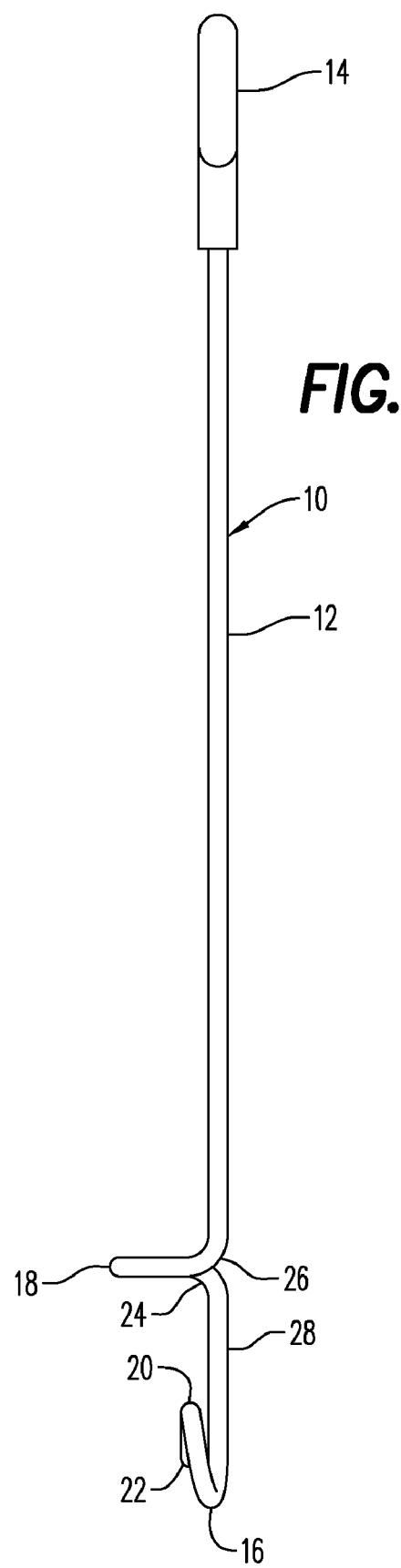

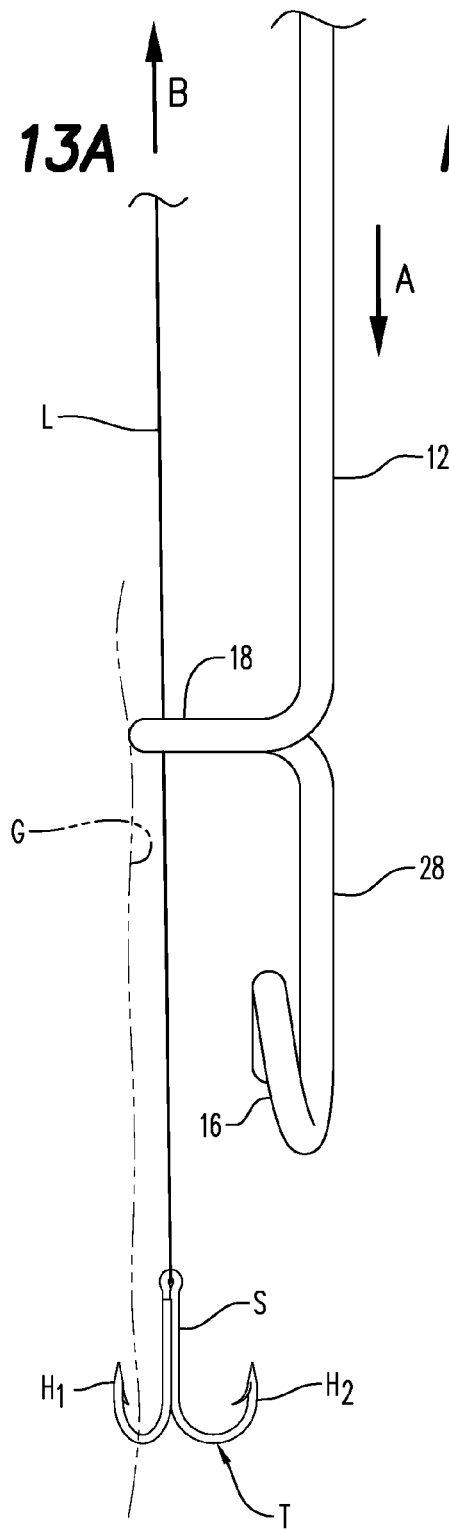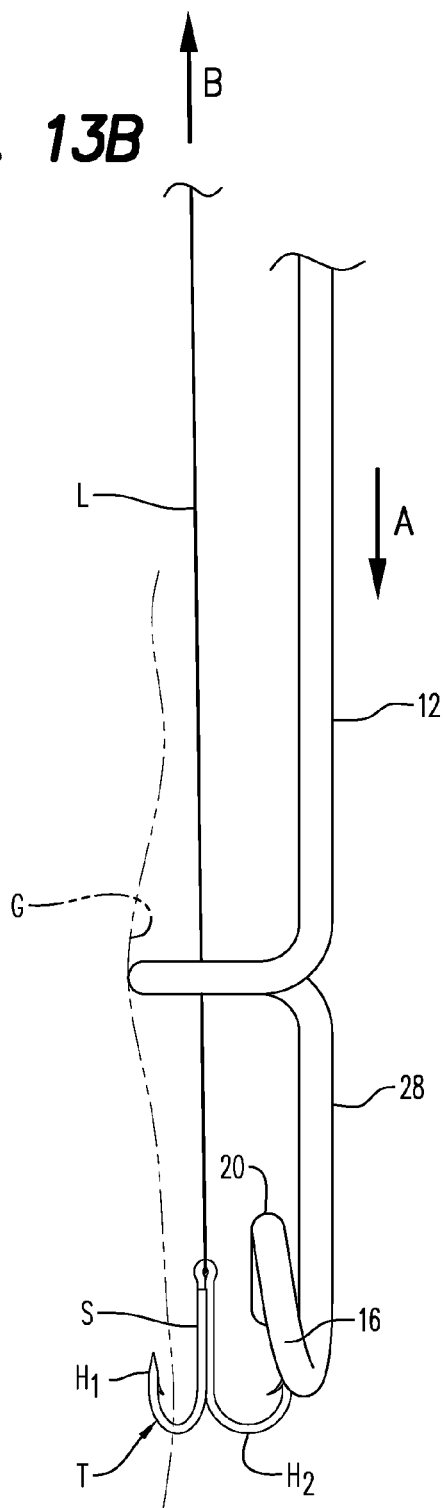

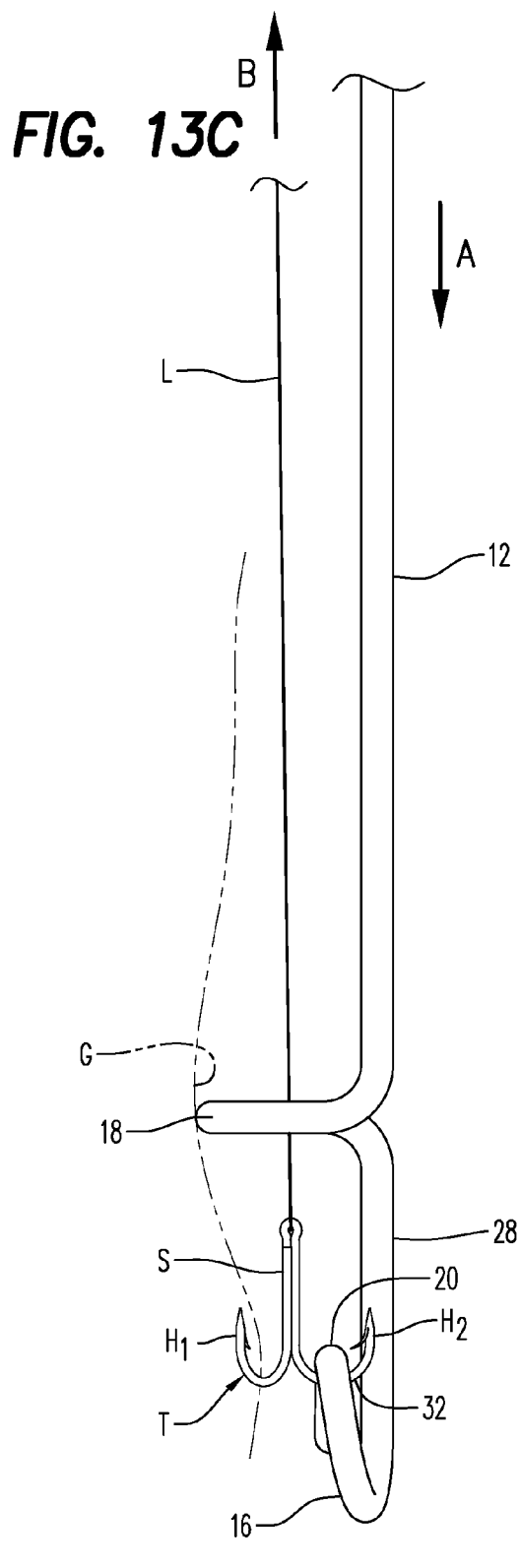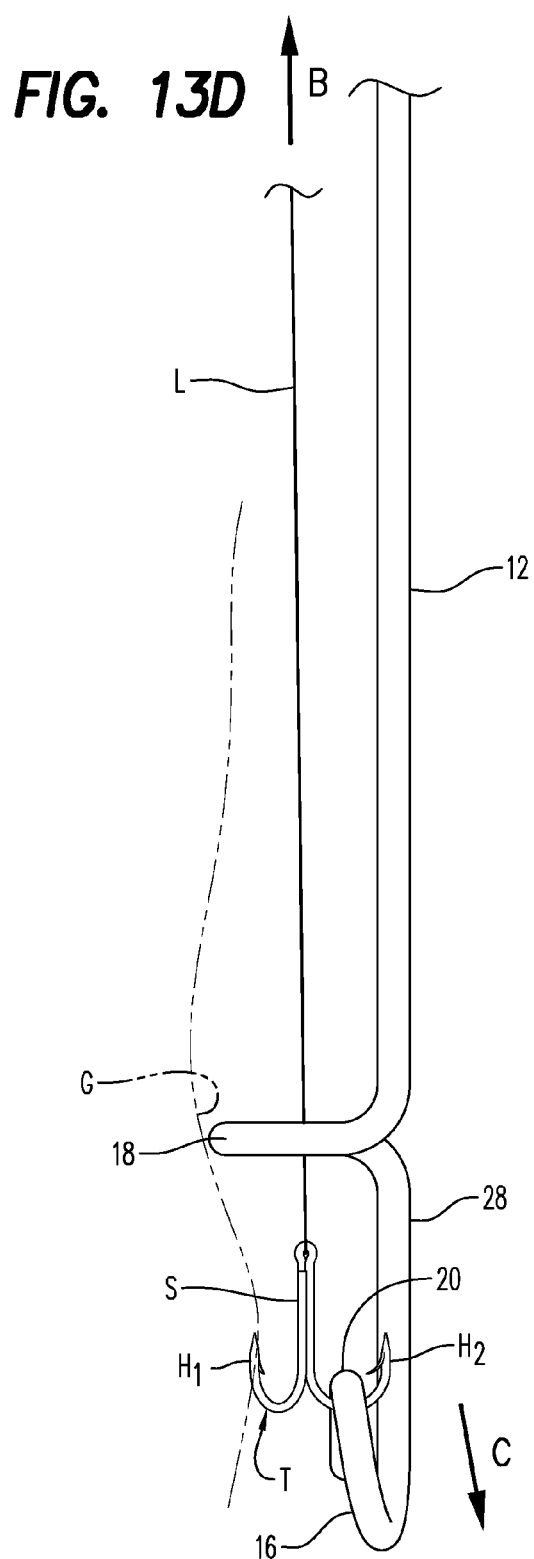

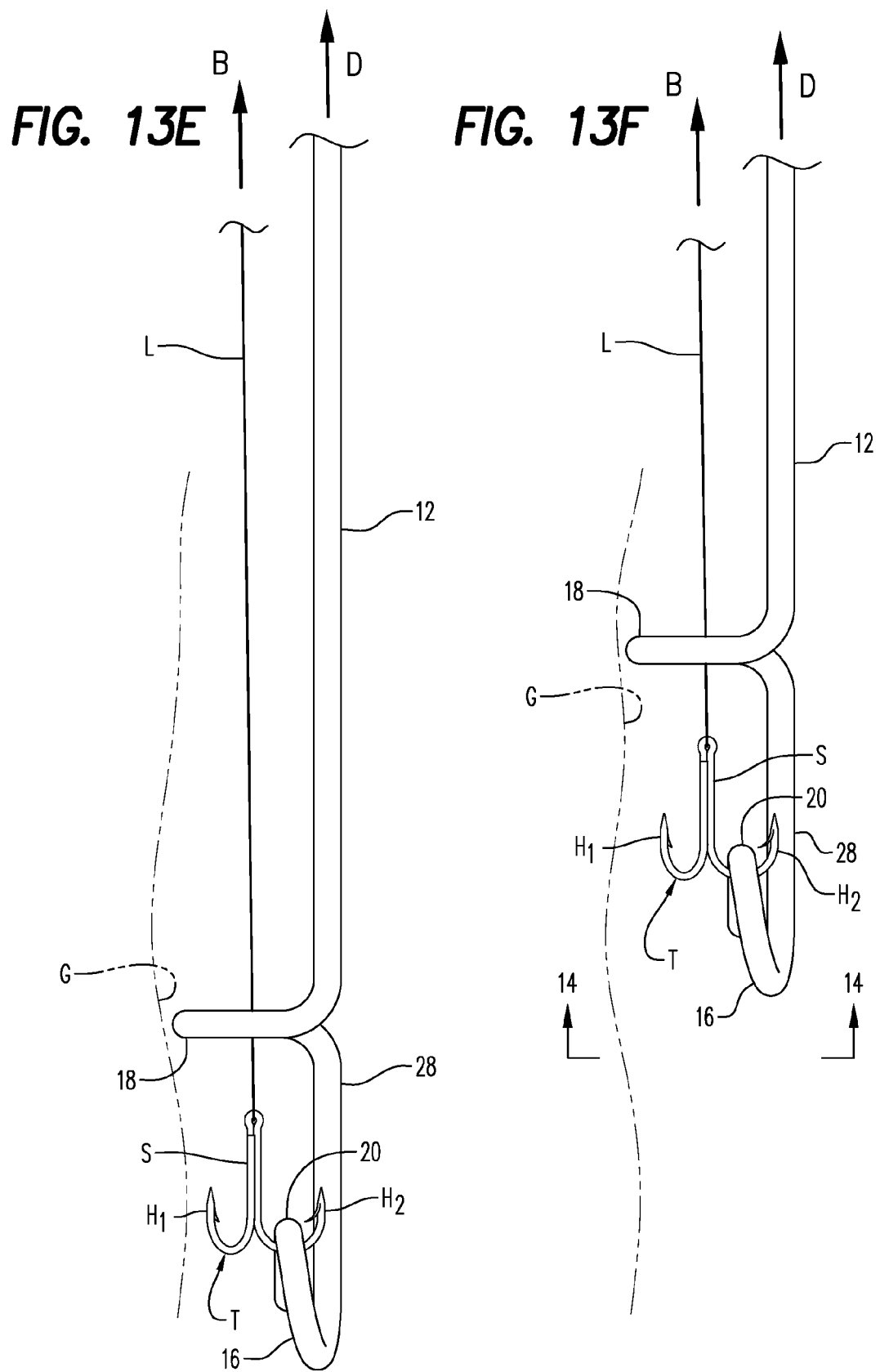

FISH DEHOOKING DEVICE

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to dehooking devices for the safe and easy removal of fish hooks from within a fish, and more particularly to a dehooking device which will release a treble hook from within the gullet of a fish and then shield the three hooks from reengaging the fish as it is withdrawn with the device from the fish.

2. Description of Related Art

Removal of a fish hook from the gullet or throat of a fish can be difficult, especially when the hook is set deep within the fish and hard to reach by hand or with long nose pliers. A number of prior art devices are known to facilitate the removal of the hook from the flesh of the fish while doing minimal harm to the fish and/or damage to the flesh itself, especially when "catching and releasing".

U.S. Pat. No. 4,028,825 to Tetzner discloses a tool for removing from a fish a barbed hook attached to a line. Dick teaches a dehooking device with a slidable mouth bite sleeve for safely removing a hook from a fish or turtle's mouth in U.S. Pat. No. 6,840,002.

A fish hook remover having a shank and a spiral hook engaging flight on the shank is disclosed in U.S. Pat. No. 6,453,601 to Duncan. U.S. Pat. No. 4,914,853 to Swindle discloses a fish dehooking device consisting of a rod with a t-shaped handle at one end and a fishhook dislodging angled portion at the opposite end, as well as spreaders for holding open the throat and mouth of a large fish and devices for engaging the fishhook.

Underwood teaches a fish hook disgorger in U.S. Pat. No. 2,441,458. A device for removing embedded fish hooks is taught by Aye in U.S. Pat. No. 2,519,098.

U.S. Pat. No. 2,662,331 to Borup discloses an apparatus for dislodging and extracting a fish hook. Steiner teaches an apparatus to remove a barbed fish hook from a fish without manually contacting the fish in U.S. Pat. No. 2,781,599.

A device for removing a fish hook having a rigid shaft and a handle on one end and being bent to form a loop in the other end is disclosed in U.S. Pat. No. 3,603,021 to Nunley. U.S. Pat. No. 3,721,034 to Collins discloses an apparatus for safely removing a fish hook.

Petersen, Jr. teaches an apparatus and method to expedite the removal of treble hook from a fish in U.S. Pat. No. 3,872,618.

The removal of a treble hook, a fish hook having three separate barbs of three separate hooks which are spaced equidistant to one another with a common shank, presents an even more difficult removal task because, even when only one or two hooks embedded in the flesh are removed, withdrawing the treble hook from the fish can be extremely difficult. The hooks continue to come in contact with the flesh of the fish as the hook is withdrawn. Further complications may arise when the treble hook is attached to a lure which must also be manipulated while the treble hook is being withdrawn.

Only U.S. Pat. No. 3,872,618 to Petersen addresses the issue of removal of a treble hook from within a fish. The Petersen teaching involves a wad or mass of netting material secured to one end of an elongated shaft to form a swab like appendage to enmesh or snare one of the barbed ends of a treble hook and by manipulation, entangle the other barbs of the other hooks into the mesh whereby the treble hook may be then removed from within the fish.

The present invention teaches a unique fish dehooker which will first easily remove the treble hook from the flesh of the fish and then, as the treble hook is withdrawn along with the device, shields the hooks from contacting the flesh of the fish as the hook and device are fully withdrawn.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a dehooking device with treble hook guard including an elongated rod having a handle disposed at a first end thereof. A spiral looped hook removal end is formed at a second end of the rod and a looped treble hook guard positioned in close proximity to the hook removal end is formed being transversely oriented to the rod. The hook guard defines a perimeter at least as large as that defined by the distal ends of the hooks of a treble hook to protect hooks from reengagement with the gullet or mouth of the fish while the treble hook is being withdrawn from a gullet of a fish along with the device.

It is therefore an object of this invention to provide a dehooking device for the release and removal of a treble hook from the flesh of the fish without concern for inadvertent reengagement of any of the hooks with the fish flesh.

Yet another object of this invention is to provide a treble hook dehooker device which will easily release the hooks from the flesh of the fish and then shield all of the hooks of a treble hook from further unwanted engagement with the fish flesh as the treble and the device are removed from the fish together.

Still another object of this invention is to provide an easily manufacturable, economical treble hook dehooker which will release a treble hook from within a fish and then prevent further hook engagement with the fish by the treble hook while being withdrawn.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

FIGS. 1 to 4 are various perspective views of the invention.

FIG. 5 is a right side elevation view of the invention.

FIG. 6 is a left side elevation view of the invention.

FIGS. 13A to 13F are enlarged views depicting the steps of treble hook removal from the gullet of a fish using the device.

Figure 7:
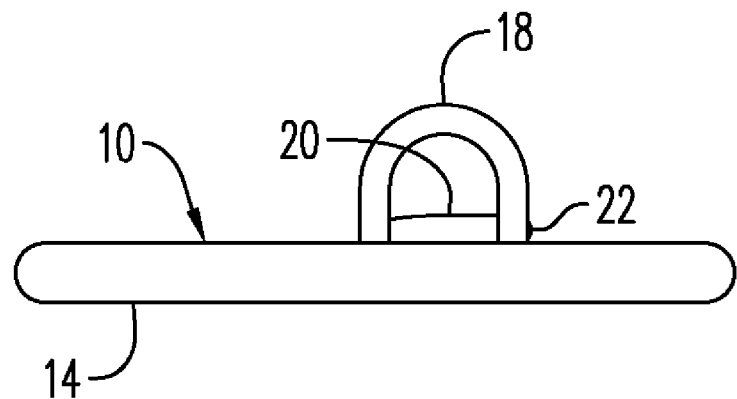
FIG. 7 is a top plan view of the invention.

Exemplary embodiments are illustrated in reference figures of the drawings. It is intended that the embodiments and figures disclosed herein are to be considered to be illustrative rather than limiting.

DETAILED DESCRIPTION OF THE INVENTION

Referring now to the drawings, and firstly to FIGS. 1 to 10, the preferred embodiment of the invention is there shown generally at numeral 10 and is formed of a single length of rigid or stiff wire or rod 12, preferably stainless steel rod, having a diameter of about 1/8" to 3/16". A transversely oriented handle 14, preferably encapsulated with a grippable elastomeric or molded plastic material, is disposed at the proximal or first end of the rod 12. The handle 14 preferably extends symmetrically about the axis of the rod 12 to facilitate accurate and controlled manipulation of the opposite end of the rod 12 (defined herebelow) and to effect effective pushing and pulling of the device 10 at appropriate points in the removal and withdrawal of a treble hook from within a fish (described with reference to FIGS. 13A to 13F herebelow). A spiral looped hook removal end 16 is formed at a distal or second end of the rod 12. This hook removal end 16 extends through approximately 360 degrees and defines a small gap between the rounded end 22 and a straight portion 28 leading away from the hook removal end 16. This gap or space between the distal end 22 and straight rod segment 28 facilitates positioning of a fish line L therebetween so that the fish line L will then pass through the central open area of the fish removal end 16 and guide it down to the hook embedded in the flesh of the fish.

Disposed in close proximity to the hook removal end 16 is a looped treble hook guard 18 which extends laterally from the axis or length of the rod 12 and parallel straight rod segment 28. This hook guard 18 has an arcuate form and generally extends through at least 180 degrees forming a generally U-shaped guard or shield, the size and function of which will be described herebelow in relation to the size of a treble hook lodged within the flesh of a gullet G of a fish F.

Figure 8:
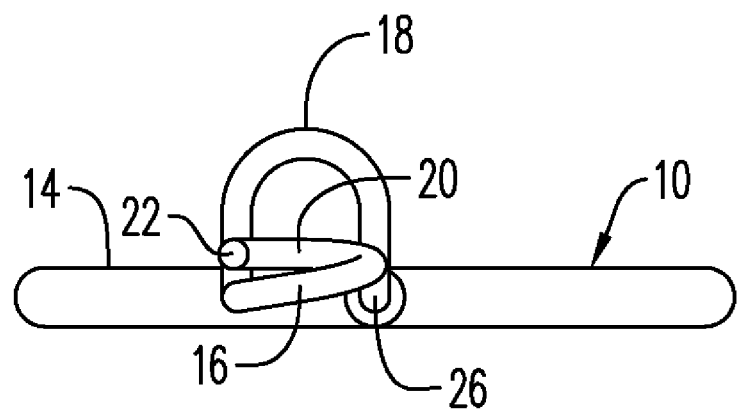
FIG. 8 is a bottom plan view of the invention.
Figure 9:
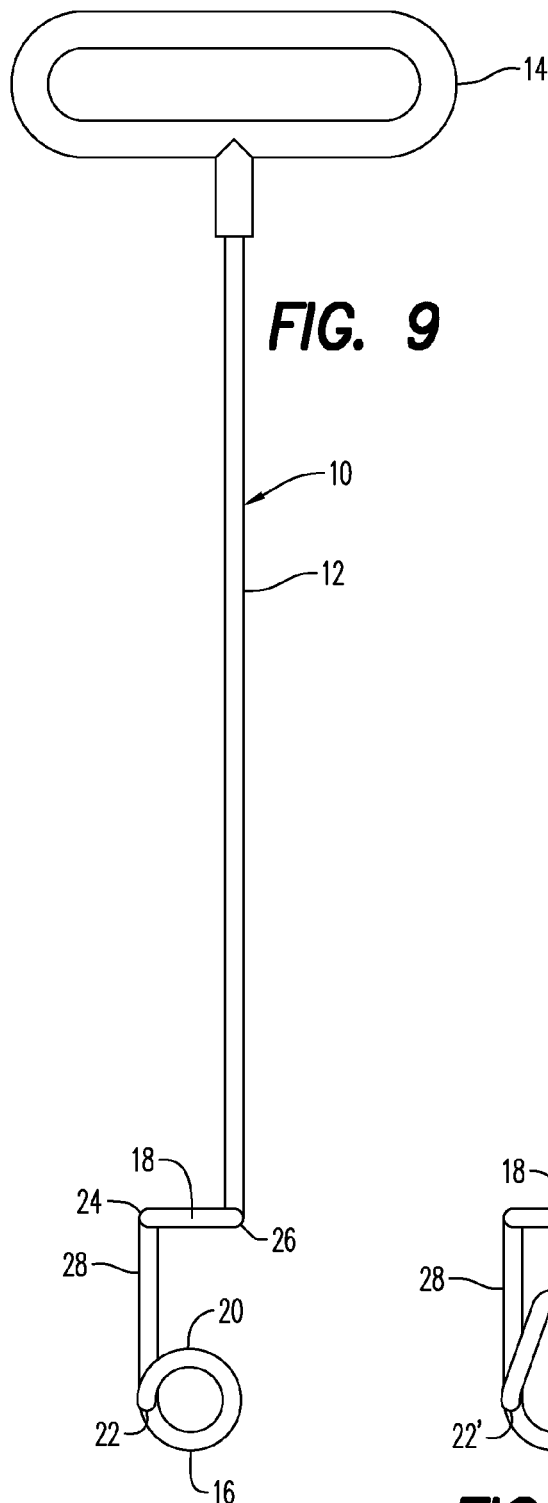
FIG. 9 is a front elevation view of the invention.
Figure 10:
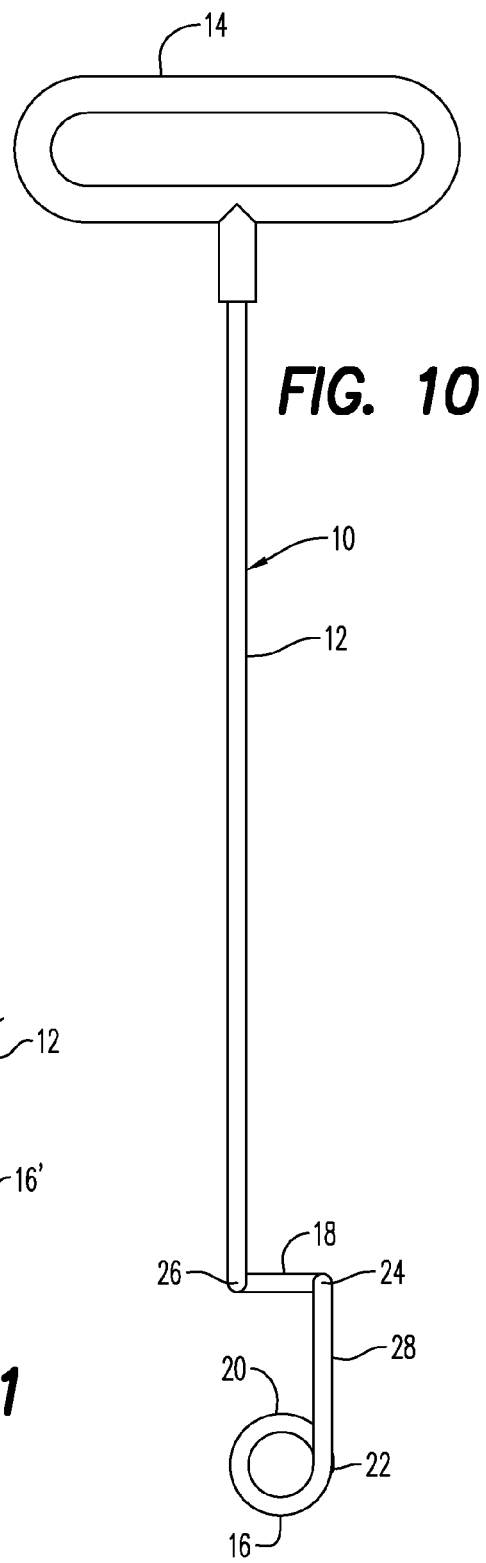
FIG. 10 is a rear elevation view of the invention.

The hook guard 18 again, having a generally U-shaped configuration and extending orthogonally from the axis of the rod 12, is defined between 90 degree bends of the rod material at 22 and at 26 and, as best seen in FIGS. 9 and 10, extends transversely and preferably orthogonally from the length of the rod 12. As best seen in FIGS. 7 and 8, the handle 14, the rod 12 and the hook removal end 16 generally lie in the same plane, while the hook guard 18 extends laterally orthogonally in one direction from that plane as will be more fully described with respect to FIG. 14 herebelow.

Figure 11:
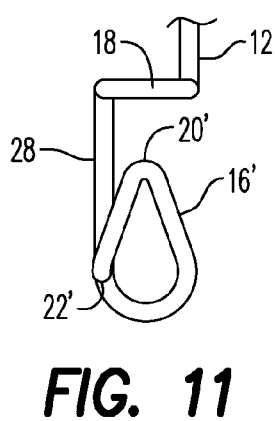
FIG. 11 is a partial front elevation view of an alternate embodiment of the hook removal distal end of the invention.

Referring now to FIG. 11, an alternate embodiment of the hook removal distal end 16' is there shown. This hook removal end 16' is formed as a continuing portion of the straight portion 28 of rod 12 and also extends through approximately 360 degrees as previously described. However, this hook removal portion 16' includes an upwardly pointing V-shaped portion 20' positioned at the proximal portion of the hook removal end 16' which serves to more quickly and positively orient and establish contact with one of the hooks of the treble hook T.

Figure 12:
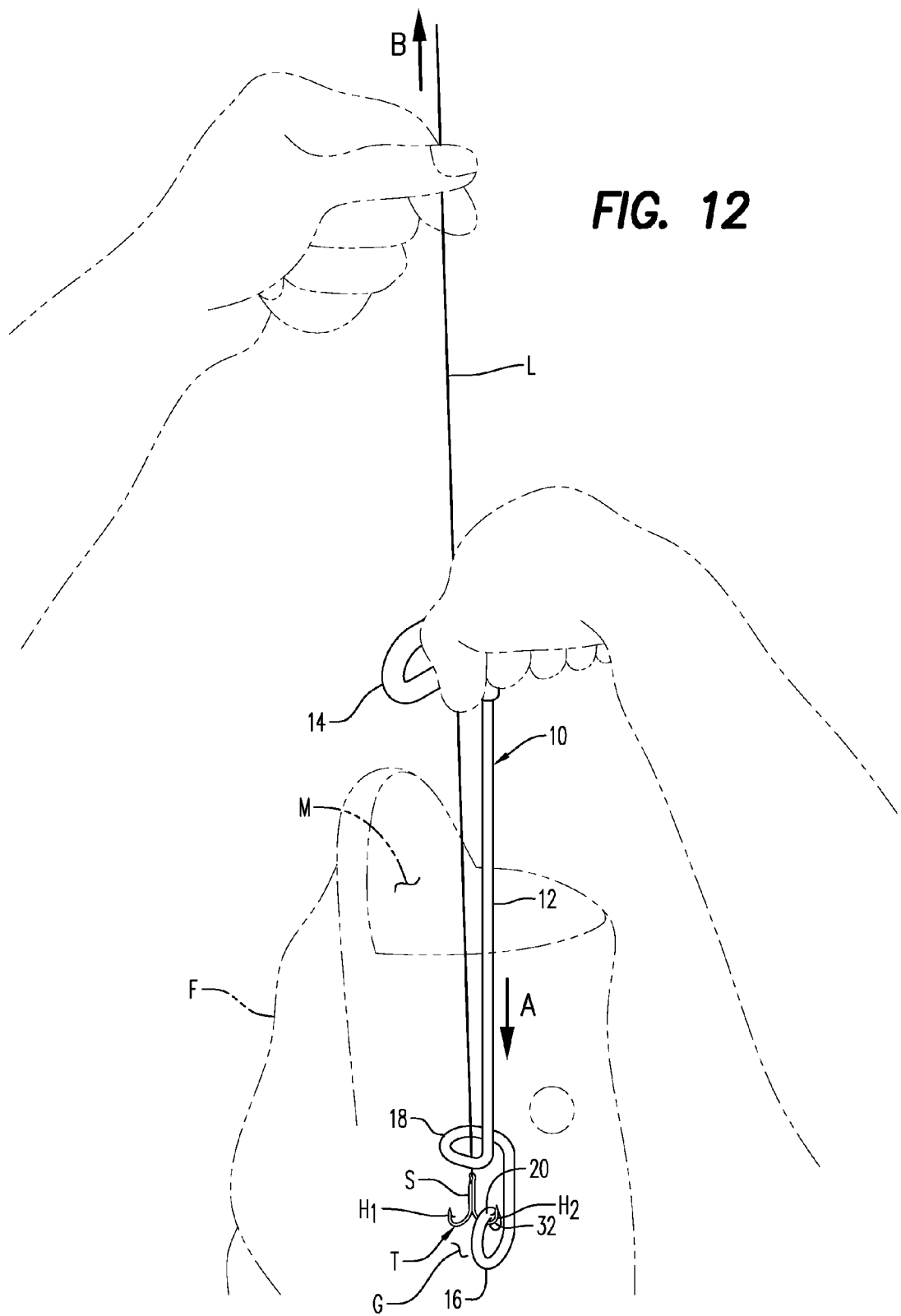
FIG. 12 is a pictorial view of the device being used to release the treble hook from within a fish (shown in phantom).

Referring now to FIG. 12, one stage of treble hook removal from the gullet G of a fish F is there depicted. The hook removal end 16 has been positioned over the fish line or leader L and extended downwardly by grasping handle 14 and moving it into the fish in the direction of arrow A. The line is held taught and lightly tensioned upwardly or outwardly from the fish in the direction of arrow B. This first stage of treble hook T removal is shown in FIGS. 13A and 13B wherein the hook removal end 16 is moved downwardly toward one of the three hooks H2 of the treble hook T, progressing in inward movement of the device 10 shown in FIG. 13B into engagement with one of the free hooks H2 until the top or proximal side 20 of the hook removal end 16. At this point, as seen in FIG. 13D, a sharp downward pressure in the direction of arrow C is exerted by the hook removal end 16 via handle 14 to dislodge the hook H1 from the flesh of the gullet G.

Figure 14:
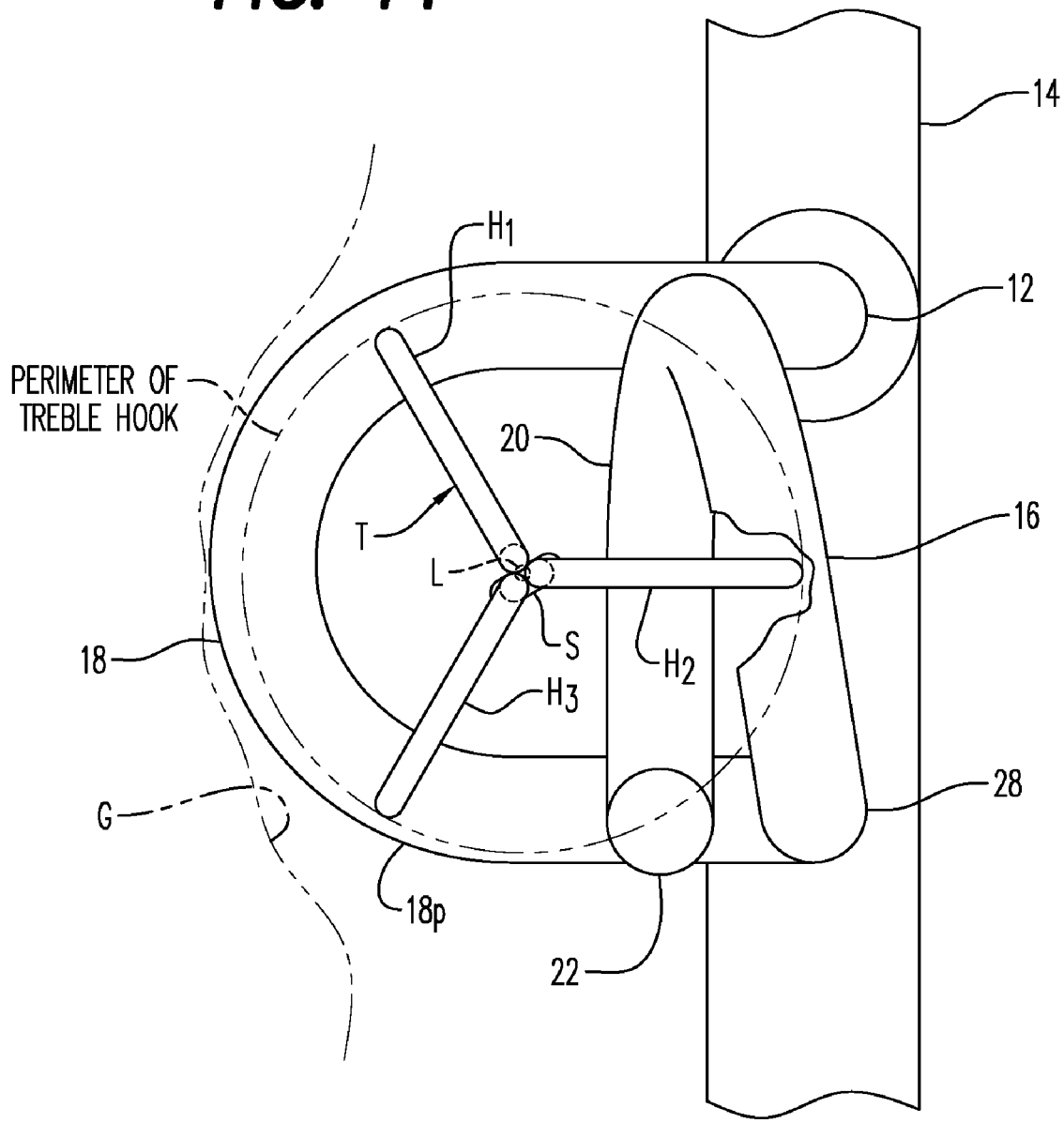
FIG. 14 is an enlarged bottom view in the direction of arrows 14-14 in FIG. 13F.

It is at this point that the virtues and important aspects of this invention come into play. The treble hook T must now be carefully removed from the gullet G of the fish without inadvertently reengaging any of the hooks H1, H2 or H3 back into the flesh of the fish F. Referring additionally to FIG. 14, while maintaining tension in the direction of arrow B on the line or leader L, the device 10 is moved in the direction of arrow D outwardly from the gullet G of the fish F. By maintaining tension on the line or leader L in the direction of arrow B, hook H2 remains in contact with the proximal inner portion 20 of the looped hook removal end 16. To prevent either of the additional hooks H1 or H3 from reengagement with the flesh of the gullet G, the hook guard 18 is sized to be at least equal to the plan perimeter of the treble hook shown in dashed lines in FIG. 14. By being positioned in close proximity to the hook removal end 16 and thus the perimeter of the treble hook T, the hook guard 2018 leads the way out of the fish and shields the hooks H1 and H3 from further flesh engagement. Hook H2, being held against the proximal portion 20 of the hook removal end 16, is also shielded from reengagement with the flesh of the fish effecting a smooth and clean removal of the treble hook T from within the fish.

Still referring to FIG. 14, the important aspect of the invention is to shield all of the hooks H1, H2 and H3 from any further inadvertent reengagement as the device 10 is withdrawn form the fish after the treble hook T and each of the corresponding hooks H1 or H2 or H3 have been dislodged from the flesh of the gullet G as previously described. Therefore, so long as the outer surface of the hook guard 18 is sufficient in size and in close proximity to the distal barb ends of the hooks H1, H2 and H3 to prevent contact and reengagement with the flesh of the gullet G, the inventive aspects of the invention are met.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A fish dehooking device comprising:
an elongated slender rod having a handle disposed at one end of said rod;

a looped treble hook guard having first and second ends, the first end of the hook guard being connected to an opposite end of said rod, said looped treble hook guard extending laterally from and substantially orthogonal to said rod;

a short straight rod portion having first and second ends, said short straight rod portion being substantially parallel to and laterally offset from said rod, said second end of said looped treble hook guard connected to said first end of said short straight rod portion;

a generally spiral looped hook removal end connected to the second end of the short straight rod portion, said hook removal end being spiral wrapped so as to extend through approximately 360 degrees and lying in a plane which is at an acute angle relative to a longitudinal axis of the short straight rod portion;

said hook guard having a shape which extends through approximately 180 degrees and being sized and shaped, when viewed along a length of said rod, to equal or exceed a projected area of a treble fishing hook when one hook of the treble fishing hook is engaged against said hook removal end;

said hook guard, in combination with said hook removal end, defining a projected perimeter lengthwise of said rod at least as large as that of a treble hook whereby hooks of the treble hook may be withdrawn from a gullet of a fish together with said device without reengagement of any of the hooks into the gullet of the fish.

2. A treble hook dehooking device as set forth in claim 1, wherein:

said hook removal end includes a V-shape pointing toward said handle.

3. A fish dehooking device comprising:

an elongated slender rod having a handle disposed at one end of said rod;

a looped treble hook guard having first and second ends, the first end of the hook guard being connected to an opposite end of said rod, said looped treble hook guard extending laterally from and substantially perpendicular to said rod;

a short straight rod portion having first and second ends, said short straight rod portion being substantially parallel to and laterally offset from said rod, said second end of said looped treble hook guard connected to said first end of said short straight rod portion;

a generally spiral looped hook removal end connected to the second end of the short straight rod portion, said hook removal end being spiral wrapped so as to extend through approximately 360 degrees and lying in a plane which is at an acute angle relative to a longitudinal axis of the short straight rod portion;

said hook guard having an arcuate shape which extends through approximately 180 degrees and being sized and shaped, when viewed along a length of said rod, to equal or exceed a projected area of a treble fishing hook when one hook of the treble fishing hook is engaged against said hook removal end.

4. A fish dehooking device as set forth in claim 3, wherein:

said hook removal end includes a V-shape pointing toward said handle.

5. A fish dehooking device comprising:

an elongated slender rod having a handle disposed at one end of said rod;

a looped treble hook guard having first and second ends, the first end of the hook guard being connected to an opposite end of said rod, said looped treble hook guard extending laterally from and substantially orthogonal to said rod;

a short straight rod portion having first and second ends, said short straight rod portion being substantially parallel to and laterally offset from said rod, said second end of said looped treble hook guard connected to said first end of said short straight rod portion;

a looped hook removal end connected to the second end of the short straight rod portion, said hook removal end being spiral wrapped so as to extend through approximately 360 degrees and lying in a plane which is at an acute angle relative to a longitudinal axis of the short straight rod portion;

said hook removal end including a V-shape pointing toward said handle;

said hook guard having an arcuate shape which extends through approximately 180 degrees and being sized and shaped, when viewed along a length of said rod, to equal or exceed a projected area of a treble fishing hook when one hook of the treble fishing hook is engaged against said hook removal end.

\* \* \* \* \*